US009318022B2

(12) United States Patent
Barth

(10) Patent No.: US 9,318,022 B2
(45) Date of Patent: Apr. 19, 2016

(54) METHOD FOR DETECTING A PARKING SPACE, PARKING ASSIST SYSTEM AND MOTOR VEHICLE COMPRISING A PARKING ASSIST SYSTEM

(75) Inventor: Harald Barth, Korntal-Munchingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 419 days.

(21) Appl. No.: 14/001,720

(22) PCT Filed: Mar. 1, 2012

(86) PCT No.: PCT/EP2012/053535
§ 371 (c)(1),
(2), (4) Date: Dec. 23, 2013

(87) PCT Pub. No.: WO2012/123263
PCT Pub. Date: Sep. 20, 2012

(65) Prior Publication Data
US 2014/0097971 A1 Apr. 10, 2014

(30) Foreign Application Priority Data
Mar. 11, 2011 (DE) .................. 10 2011 013 681

(51) Int. Cl.
*G08G 1/00* (2006.01)
*G08G 1/14* (2006.01)
(Continued)

(52) U.S. Cl.
CPC ............. *G08G 1/141* (2013.01); *G01S 7/52004* (2013.01); *G01S 15/87* (2013.01); *G01S 15/931* (2013.01); *G01S 2015/933* (2013.01); *G01S 2015/935* (2013.01); *G01S 2015/938* (2013.01)

(58) Field of Classification Search
CPC ............. G08G 1/141; G01S 2015/933; G01S 2015/935; G01S 2015/938
USPC ............ 340/932.2, 933, 937, 435, 436, 539.1
See application file for complete search history.

(56) References Cited

U.S. PATENT DOCUMENTS 5,581,264 A * 12/1996 Tabata ................. H01Q 1/1271
343/704
6,310,580 B2 * 10/2001 Taniguchi ...................... 343/713
(Continued)

FOREIGN PATENT DOCUMENTS

CN 101592734 A 12/2009
DE 103 40 689 A1 3/2005
(Continued)

OTHER PUBLICATIONS

Office Action in corresponding Chinese Patent Application No. 201280012834.3 dated Jul. 2, 2014, with translation (14 pages).
(Continued)

*Primary Examiner* — Daryl Pope
(74) *Attorney, Agent, or Firm* — Osha Liang LLP

(57) ABSTRACT

The invention relates to a method for detecting a parking space (20) by means of a parking assistance system (2) of a motor vehicle (1) while the motor vehicle (1) is travelling past the parking space (20). A first sensor (7) acquires a time sequence (26) of measured values (27), and a second sensor (12) likewise acquires a time sequence (31) of measured values (32) while the vehicle is travelling past. The parking space (20) is detected on the basis of the measured values (27, 32) of at least one of the sensors (7, 12). For the detection of the parking space (20), the measured values (27) of the first sensor (7) and the measured values (32) of the second sensor (12) are acquired redundantly, and the plausibility of the time sequence (26) of the measured values (27) of the first sensor (7) is checked on the basis of the measured values (32) of the second sensor (12). The invention also relates to a parking assistance system (2), as well as to a motor vehicle (1) with such a system.

11 Claims, 2 Drawing Sheets

Figure 1:
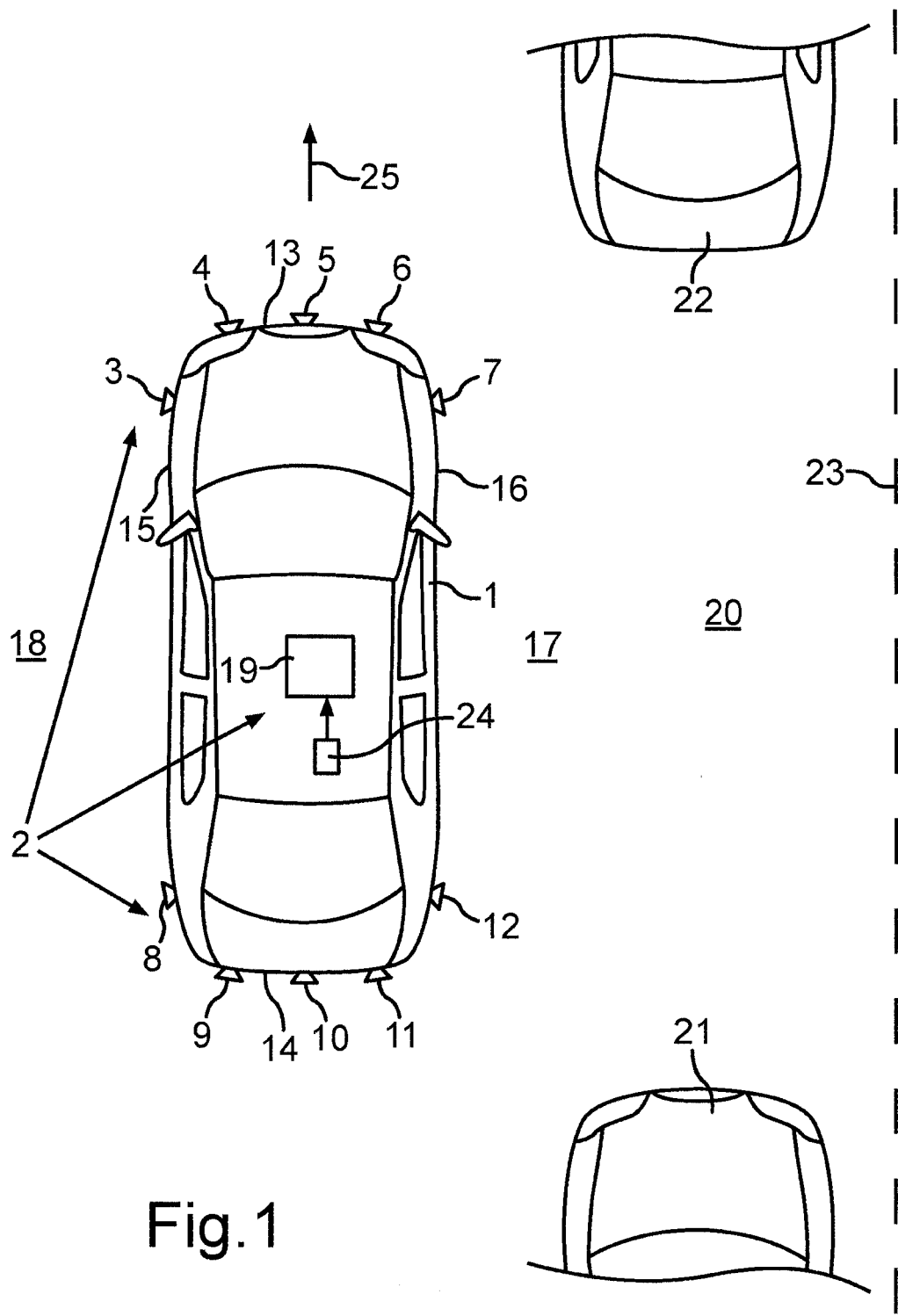

(51) Int. Cl.
    *G01S 7/52*     (2006.01)
    *G01S 15/87*     (2006.01)
    *G01S 15/93*     (2006.01)

(56) References Cited

U.S. PATENT DOCUMENTS

| | | | |
|---|---|---|---|
| 6,822,613 B2 * | 11/2004 | Kubota | H01Q 7/00 343/713 |
| 6,948,729 B2 * | 9/2005 | Zalila | B62D 15/028 280/204 |
| 8,294,624 B2 * | 10/2012 | Yamamoto | H01Q 1/1271 343/711 |
| 2009/0299627 A1 | 12/2009 | Hasegawa | |
| 2010/0161128 A1 * | 6/2010 | Choi | E04H 6/422 700/258 |
| 2011/0013201 A1 | 1/2011 | Scherl et al. | |
| 2012/0056758 A1 * | 3/2012 | Kuhlman | G08G 1/14 340/932.2 |
| 2012/0200430 A1 * | 8/2012 | Spahl | G01C 21/3685 340/932.2 |

FOREIGN PATENT DOCUMENTS

| | | |
|---|---|---|
| DE | 10 2005 015 354 A1 | 12/2005 |
| DE | 10 2004 047 485 A1 | 4/2006 |
| DE | 10 2005 046 054 A1 | 3/2007 |
| DE | 10 2008 004 632 A1 | 7/2009 |
| EP | 0 305 907 B1 | 3/1992 |
| EP | 1 475 648 A1 | 11/2004 |
| EP | 1486797 A1 | 12/2004 |
| EP | 2000822 A1 | 12/2008 |

OTHER PUBLICATIONS

International Search Report for corresponding International Application No. PCT/EP2012/053535, mailed Jun. 18, 2012 (6 pages).
Office Action for corresponding German Application No. 10 2011 013 681.9, mailed Nov. 29, 2011 (5 pages).

\* cited by examiner

METHOD FOR DETECTING A PARKING SPACE, PARKING ASSIST SYSTEM AND MOTOR VEHICLE COMPRISING A PARKING ASSIST SYSTEM

The invention relates to a method for detecting or sensing a parking space by means of a parking assistance system of a motor vehicle while the motor vehicle is travelling past the parking space. While the vehicle is travelling past, a first sensor acquires a time sequence or series of measured values; a second sensor, arranged at a distance from the first sensor, of the parking assistance system acquires a second time sequence of measured values while it travels past. The parking space is detected on the basis of the measured values of at least one of the sensors. The invention also relates to a parking assistance system which is designed to carry out such a method, and also to a motor vehicle having such a parking assistance system.

Parking assistance systems for motor vehicles are prior art. They serve to sense a parking space in which the motor vehicle can then be parked, for example automatically or semi-automatically. As a rule, ultrasonic sensors, mounted in the front region of the motor vehicle on the two sides, are used to sense the parking space. While the motor vehicle is travelling past a parking space, the ultrasonic sensor which is arranged on the side, for example in the edge region of the front bumper, continuously measures the lateral distance of the motor vehicle from obstacles which are external to the vehicle. The dimensions of the parking space and the relative position of the parking space with respect to the motor vehicle can then be determined on the basis of the profile of the measured values of the ultrasonic sensor as well as by taking into account the distance travelled. This applies both to longitudinal parking spaces, whose longitudinal axis is oriented substantially parallel to the carriageway, and to transverse parking spaces whose longitudinal axis runs perpendicularly or at an acute angle with respect to the carriageway.

Such a detection method is known, for example, from document EP 0 305 907 B1. The parking assistance device described in that document comprises an ultrasonic sensor which is arranged at a corner point of the motor vehicle. Instead of just one ultrasonic sensor, two such ultrasonic sensors can also be used, specifically, for example, at the front and the rear lateral corner point of the motor vehicle. It is therefore possible to acquire information about the size of the parking space without reference to the actual length of the motor vehicle. A sufficient size of the parking space is, in fact, present if first the rear sensor detects the start of the parking space, and the front sensor then only subsequently senses the end of the same parking space.

The use of two ultrasonic sensors for measuring a parking space is also known from document EP 1 486 797 A1. A first ultrasonic sensor is located in the front corner region of the motor vehicle, while a second ultrasonic sensor is arranged in the rear corner region of the same vehicle side. The length of a longitudinal parking space located between two other vehicles is determined, specifically as a function of the measured values of the two ultrasonic sensors. The first sensor firstly measures the lateral distance between the actual motor vehicle in question and the first vehicle which bounds the parking space from the rear. If the actual motor vehicle in question passes this first vehicle, the front ultrasonic sensor measures the direct distance from a second vehicle which bounds the parking space from the front, while the rear ultrasonic sensor measures the direct distance from the first or rear vehicle. Depending on these direct distances, as well as by taking into account the previously measured lateral distance, the relative position of the motor vehicle with respect to the parking space and the length of the parking space are determined.

Document DE 10 2004 047 485 A1 describes a method for measuring a parking space using two ultrasonic sensors of a motor vehicle, wherein both a front and a rear sensor are used, said sensors being arranged on the same side of the vehicle. The front sensor senses a front and a rear boundary of the longitudinal parking space and has a smaller range than the rear sensor. In contrast the rear sensor senses a lateral boundary of the longitudinal parking space and therefore has a correspondingly larger range.

According to the prior art, two ultrasonic sensors can therefore be used to sense or detect a parking space. For the measurement of the parking space, both the measured values of the first sensor and the measured values of the second sensor are used directly here. If one of the sensors supplies inaccurate measured values, or even none at all—for example owing to a low level of sensitivity—or if one of the sensors fails, it is no longer possible to sense the parking space.

The object of the invention is to indicate a way of particularly reliably detecting and, in particular, also measuring, the parking space with a method of the generic type mentioned at the beginning.

This object is achieved according to the invention by means of a method having the features of Patent Claim 1, by means of a parking assistance system having the features according to Patent Claim 10, and also by means of a motor vehicle having the features according to Patent Claim 11. Advantageous embodiments of the invention are the subject matter of the dependent patent claims, the description and the figures.

A method according to the invention is designed to detect a parking space by means of a parking assistance system of a motor vehicle while the motor vehicle is travelling past the parking space. A time sequence of measured values is acquired by means of a first sensor of the parking assistance system while the vehicle is travelling past. A second sensor, arranged at a distance from the first sensor, also acquires a time sequence or series of measured values while the motor vehicle is travelling past. The parking space is detected or sensed on the basis of the measured values of at least one of the sensors. For the detection of the parking space, the measured values of the first sensor and the measured values of the second sensor are sensed redundantly, with the result that the plausibility of the time sequence of the measured values of the first sensor is checked on the basis of the measured values of the second sensor.

A core idea of the invention is therefore, in other words, that as the motor vehicle travels past the parking space is sensed redundantly by means of two separate sensors which are arranged, in particular, on the same side of the motor vehicle. The sequence of the measured values of the first sensor is compared with the sequence of the measured values of the second sensor, and the plausibility thereof is therefore checked. In this way it is possible to detect the parking space in a particularly reliable way. If the first sensor fails or if this sensor supplies implausible measured values, the parking space can actually be detected on the basis of the measured values of the second sensor or else measured values of the sequence of the second sensor can be added to the measured values of the first sensor. It is therefore possible for gaps in the measurement series of one of the sensors to have corresponding or spatially assigned measured values of the other sensor added to them.

The first sensor is preferably a front sensor which is arranged in a front region of the motor vehicle, in particular on a side. It is therefore possible for the front sensor to be mounted in a corner region of the motor vehicle, for example in the front region of the side. The front sensor then senses the surrounding region laterally next to the motor vehicle, and parking spaces which are also located laterally next to the motor vehicle can also be detected. In contrast, the second sensor is preferably a rear sensor which is arranged in a rear region of the motor vehicle, in particular on the same side. The rear sensor can therefore be mounted in a rear corner region of the motor vehicle, for example in the rear region of a side. Parking spaces which are located laterally next to the motor vehicle can therefore also be sensed with the second sensor. Preferably, two first sensors, specifically located opposite on the left-hand side, on the one hand, and on the right-hand side, on the other, each in the front region of the motor vehicle are used, and two rear sensors, specifically lying opposite both on the left-hand and on the right-hand sides in the rear region of the motor vehicle, are used. As a result, parking spaces can be detected both on the right-hand side and on the left-hand side of the motor vehicle.

If the first sensor is a front sensor, and the second sensor is a rear sensor, the plausibility of the measured values of the front sensor is checked on the basis of the measured values of the rear sensor. With the front sensor, the parking space can in fact be sensed significantly more quickly than with the rear sensor, and the plausibility of this detection can then be checked on the basis of the measured values of the rear sensor.

The second sensor is arranged at a distance from the first sensor. While the motor vehicle travels past the parking space, the sensors therefore acquire respective sequences of measured values which have substantially the same form or the same profile, but are offset (chronologically) in relation to one another owing to the distance between the sensors. Owing to this offset of the respective sequences of the measured values of the two sensors, two measured values of the first sensor, on the one hand, and of the second sensor, on the other, detected at one and the same time, cannot be compared with one another. It therefore proves particularly advantageous if the following assignment is made: for the checking of the plausibility, the measured values of the sequence of the first sensor can be assigned in pairs to corresponding measured values of the sequence of the second sensor in such a way that the measured values which are assigned to one another also relate to measurements at one and the same spatial point. The measured values which are assigned to one another therefore characterize, in particular, the distance of the motor vehicle with respect to one and the same spatial point or one and the same surface unit of an obstacle. The measured values which are assigned to one another are therefore those measured values of the first sensor, on the one hand, and of the second sensor, on the other, which were recorded substantially at one and the same location or at one and the same position of the sensors, but in chronological succession. By such an assignment of the measured values of the sequence of the first sensor to the measured values of the sequence of the second sensor, the plausibility of the sequence of the first sensor can be checked without much effort, specifically by a simple comparison of the measured values.

The specified assignment of the measured values can be carried out as a function of a distance between the two sensors in the longitudinal direction of the vehicle and/or as a function of a distance covered by the motor vehicle as it travels past. This distance may be measured using a distance sensor. If the distance between the sensors in the longitudinal direction and/or the distance covered are/is known, the offset between the signals or the sequences of the measured values of the two sensors can be reliably determined with a high level of accuracy, with the result that the assignment of the respective measured values to one another can also be carried out particularly precisely.

In the case of a sensor, in particular ultrasonic sensor, it is known that a transmission signal is emitted and a signal which is reflected by an obstacle is received. The reflected signal is also referred to as an "echo". The amplitude of the received signal is then compared as a rule with a threshold value and it is checked whether or not this amplitude is greater than the predetermined threshold value. A relatively large amplitude is evaluated as a detection, and a corresponding measured value, which characterizes, for example, the distance from the obstacle, is present. This distance or measured value can be determined from a propagation time of the signal. On the other hand, if the amplitude of the received signal is smaller than the specified threshold value, there is no detection occurring, and there is therefore no measured value. It is also possible for the amplitude of the received signal to be relatively small and no longer clearly measurable owing to the noise. In this case, there is likewise no measured value present, but the received signal can continue to be filtered out in order then still to ensure evaluation of the amplitude under certain circumstances.

It may therefore be the case that in the sequence of the measured values one of the sensors lacks a number of measured values even though an obstacle is actually to be detected. The measured values can be missing, for example, owing to relatively low sensitivity of the sensor. Quite generally, for this reason it is possible to provide that measured values from the time sequence of the second sensor are added to the time sequence of the measured values of the first sensor. In this way it is possible to obtain a complete sequence of the measured values, which significantly increases the precision during the detection, in particular during the measurement, of the parking space.

It is also possible to provide that the sequence of measured values of the first sensor is subjected to particular filtering, specifically when it is detected during this sequence certain measured values are missing yet the sequence of the measured values of the second sensor contains, at the same locations, measured values which can be acquired.

The following procedure proves particularly advantageous: it is checked whether or not measured values are missing in the sequence of the first sensor. If a measured value is missing, it is checked whether a corresponding or assigned measured value is present or not in the sequence of the second sensor. If the corresponding measured value is present in the sequence of the second sensor, this measured value is added to the sequence of the first sensor. If, on the other hand, the corresponding measured value is not present in the sequence of the second sensor either, the sequence of the first sensor is assumed to be, or confirmed as being, plausible with respect to the missing measured value. It is therefore checked whether or not the time sequence of the measured values of the first sensor is plausible, specifically on the basis of the time sequence of the second sensor. The parking space can then be detected, in particular measured, on the basis of the time sequence of the measured values of the first sensor, to which, if appropriate, additions have been made. In this way, the probability of an error during the detection of the parking space is reduced to a minimum.

The detection of the parking space preferably includes the fact that the parking space is measured. In particular, a length and/or a width of the parking space is/are determined on the basis of the sequence of the measured values of the first sensor whose plausibility has been checked. If the parking space is measured, its dimensions can be compared with the stored dimensions of the motor vehicle, and it is possible to check whether or not the motor vehicle can be parked in this parking space. The distance covered by the motor vehicle while it travels past is preferably also taken into account during the measurement of the parking space.

Ultrasonic sensors by which the respective sequences of the measured values are acquired are preferably used. The measured values characterize, in particular, on the one hand distances between the respective sensors and on the other hand obstacles which are external to the vehicle and which bound the parking space. The sensors preferably each have a relatively narrow sensing angle or sensing range, with the result that a relatively large spatial resolution of the measured values is ensured and the start and end of the parking space can be unambiguously identified.

Furthermore, according to the invention a parking assistance system is made available for a motor vehicle, which system is designed to detect a parking space while the motor vehicle is travelling past the parking space. Said system includes a first sensor for acquiring a time sequence of measured values, as well as a second sensor which is arranged at a distance from on the first sensor and which is also designed to acquire a time sequence of measured values. Detection means are made available which detect the parking space on the basis of the measured values of at least one of the sensors. For the detection of the parking space, the measured values of the first sensor and the measured values of the second sensor are sensed redundantly, wherein the parking assistance system also has checking means which check the plausibility of the time sequence of the measured values of the first sensor on the basis of the measured values of the second sensor.

A motor vehicle according to the invention comprises a parking assistance system according to the invention.

The preferred embodiments which are presented with respect to the method according to the invention, and the advantages thereof, apply correspondingly to the parking assistance system according to the invention and to the motor vehicle according to the invention.

Further features of the invention can be found in the claims, the figures and the description of the figures. All the features and combinations of features specified in the description and the features and combination of features which are specified below in the description of the figures and/or shown solely in the figures can be used not only in the respectively specified combination but also in other combinations or else alone.

Figure 2A:
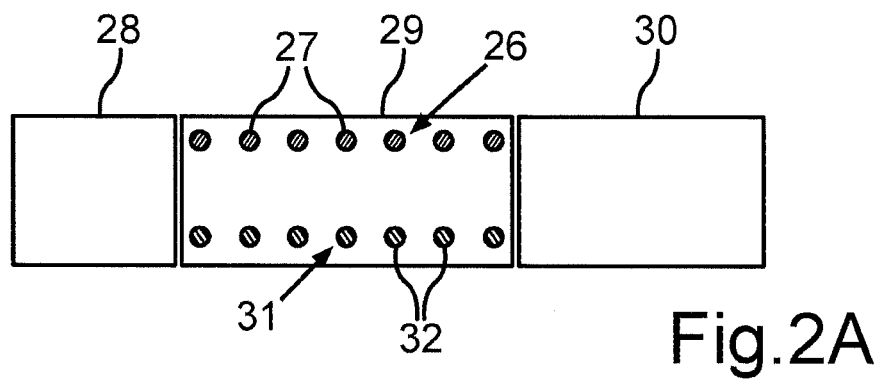
Figure 2B:
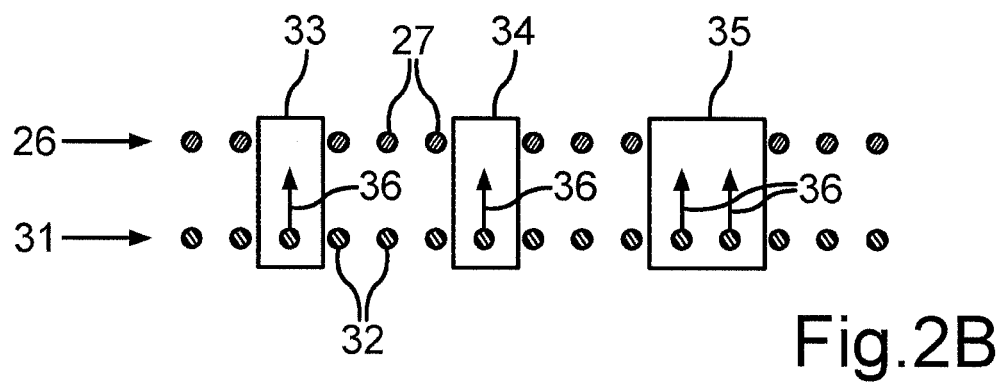
Figure 2C:
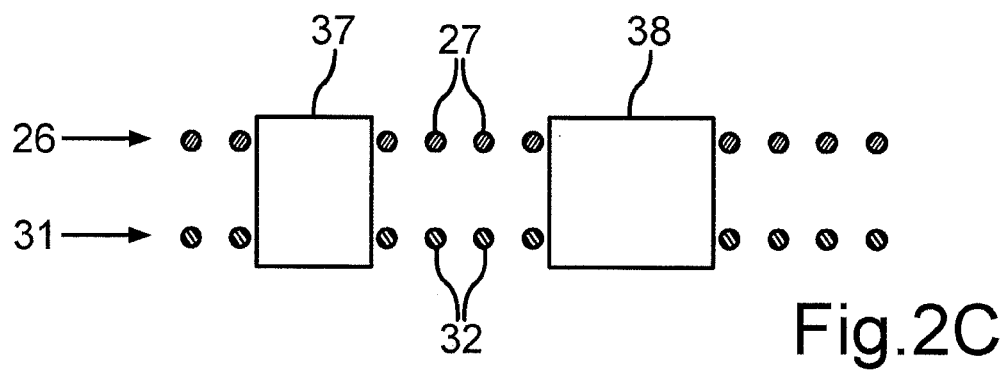

The invention will now be explained in more detail with respect to individual preferred exemplary embodiments, as well as with reference to the appended drawings, in which:

FIG. 1 shows a schematic illustration of a motor vehicle having a parking assistance system according to an embodiment of the invention, wherein a method according to one embodiment of the invention is explained in more detail; and FIGS. 2A to 2C each show time sequences and measured values of a first sensor and of a second sensor, wherein a method according to one embodiment of the invention is explained in more detail.

A motor vehicle 1 (illustrated in FIG. 1) according to an embodiment of the invention is, for example, a passenger car. The motor vehicle 1 comprises a parking assistance system 2, which serves to assist a driver of the motor vehicle 1 in parking in a parking space. The parking assistance system 2 comprises a multiplicity of ultrasonic sensors 3 to 12 which are arranged distributed on a front bumper 13 and on a rear bumper 14.

Five ultrasonic sensors 3 to 7 are preferably mounted on the front bumper 13, as well as five sensors 8 to 12 on the rear bumper 14. The ultrasonic sensor 3 is located here in a left-hand corner region or edge region of the front bumper 13, and therefore in the left-hand corner region of the motor vehicle 1, specifically on a left-hand side 15. In contrast, the ultrasonic sensor 7 is mounted symmetrically on a right-hand side 16 of the motor vehicle 1, specifically in the front corner region of the motor vehicle 1. Correspondingly, the ultrasonic sensors 8 and 12 are arranged in the rear region of the motor vehicle, specifically on the left-hand side 15, on the one hand, and on the right-hand side 16, on the other. The ultrasonic sensors 7 and 12 therefore sense a surrounding region 17 on the right next to the motor vehicle 1, while the ultrasonic sensors 3 and 8 sense a surrounding region 18 on the left-hand side of the motor vehicle 1.

The ultrasonic sensors 4, 5, 6 and 9, 10, 11 are provided optionally.

At least the ultrasonic sensors 3, 7 and 8, 12 have a relatively narrow sensing angle or sensing region in the horizontal direction. This sensing angle can be, for example, in a value range from 5° to 20°. For example, it can be 15°.

The parking assistance system 2 also includes a control device 19 (detection means and checking means) which can include, for example, a microcontroller, a digital signal processor and a memory. The control device 19 is coupled electrically to the ultrasonic sensors 3 to 7 and 8 to 12. The control device 19 receives measured values from each of the sensors 3 to 7 and 8 to 12.

A method according to an embodiment of the invention will be explained in more detail below. Even if the following description relates only to the right-hand sensors 7 and 12, the method can, of course, also be applied to the left-hand sensors 3 and 8 if a parking space is located on the left-hand side of the motor vehicle 1.

As already stated, the parking assistance system 2 serves to assist the driver in parking in a parking space. In particular, by means of the parking assistance system 2 it is possible to detect parking spaces. After a parking space has been sensed, the parking assistance system 2 can calculate a parking path or a trajectory along which the motor vehicle 1 can then be parked automatically or else semi-automatically in the parking space.

As illustrated in FIG. 1, a parking space 20, in this case a longitudinal parking space, is sensed while the motor vehicle 1 travels past this parking space 20. The motor vehicle 1 moves forwards here, specifically according to the illustrated arrow 25. While the vehicle travels past the parking space 20, the lateral ultrasonic sensors 7 and 12 each acquire a time sequence of measured values. These sequences are offset chronologically in relation to one another owing to the distance between the ultrasonic sensors 7, 12 in the longitudinal direction of the vehicle. A vehicle 21 which bounds the parking space 20 from the rear is firstly sensed by the ultrasonic sensor 7, and only then by the ultrasonic sensor 12. Correspondingly, a vehicle 22 which bounds the parking space 20 from the front is firstly sensed with the front ultrasonic sensor 7 and only then with the rear ultrasonic sensor 12. The profile or the shape of the two sequences of the measured values is however substantially the same because both ultrasonic sensors 7, 12 firstly sense the motor vehicle 21, and then, if appropriate, a kerb 23 and subsequently the further motor vehicle 22.

In principle, the parking space 20 can be detected and measured solely on the basis of the measured values of the front ultrasonic sensor 7, specifically also taking into account a distance which is covered while the vehicle travels past and is measured by means of a distance sensor 24. The ultrasonic sensor 7 in fact senses both the start of the parking space 20, which is defined by the end of the motor vehicle 21, and the end of the parking space 20, which coincides with the start of the further motor vehicle 22. If this is then linked with the distance covered, the length of the parking space 20, that is to say the dimension of the parking space 20 in the longitudinal direction of the vehicle, can be determined. In principle, therefore, the front ultrasonic sensor 7 alone is sufficient. However, it may be the case that this ultrasonic sensor 7 supplies implausible measured values, specifically, for example, owing to a lower level of sensitivity. This applies, in particular, with respect to a lateral boundary of the parking space 20 such as, for example, with respect to the kerb 23. For example, the front ultrasonic sensor 7 cannot supply any measured values even though in fact an obstacle is still present in the region of the parking space 20.

In order to check the plausibility of the sequence of the measured values of the front ultrasonic sensor 7, the measured values of the rear ultrasonic sensor 12 are then used. Firstly, the specified offset, which arises owing to the distance between the ultrasonic sensors 7, 12, between the two sequences of the measured values of the ultrasonic sensor 7, on the one hand, and the ultrasonic sensor 12, on the other, is bypassed by correspondingly assigning the measured values of the two sequences. Specifically, the measured values of the sequence of the ultrasonic sensor 7 are respectively assigned a corresponding measured value from the sequence of the ultrasonic sensor 12. A multiplicity of pairs is therefore obtained, each respectively including a measured value from the sequence of the front ultrasonic sensor 7 and a measured value from the sequence of the ultrasonic sensor 12. This assignment is effected in such a way that the measured values of each pair relate to measurements which were carried out substantially at one and the same location or in the same position of the two ultrasonic sensors 7, 12 with respect to the parking space 20. This assignment is effected as a function of the distance between the two ultrasonic sensors 7, 12 as well as taking into account the specified distance travelled.

FIG. 2A illustrates, in the upper region, an exemplary time sequence 26 of measured values 27 of the front ultrasonic sensor 7. The points illustrated in FIG. 2 symbolize the measured values of the sensors 7 and 12 and, to be more precise, the presence of the measured values. The measured values are illustrated here in a time sequence from left to right. The sequence 26 is divided into three blocks, specifically a first block 28, which does not include any measured values, a second block 29 with the measured values 27, and a third block 30 without measured values. A time sequence 31 of measured values 32 of the rear ultrasonic sensor 12 is illustrated symbolically in the lower region in FIG. 2A, which measured values 32 are assigned to the measured values 27 of the front ultrasonic sensor 27 in the way specified above. The control device 19 detects that in block 28 the front ultrasonic sensor 7 does not supply any measured values at all, and therefore no detection takes place. The plausibility of the sequence 26 of the front ultrasonic sensor 7 is now checked: the control device 19 checks whether or not the sequence 31 of the rear ultrasonic sensor 12 contains measured values at this location, that is to say in the block 28. In the exemplary embodiment according to FIG. 2A, the control device 19 detects that the sequence 31 of the rear ultrasonic sensor 13 does not comprise any measured values in the block 28 either, and the sequence 26 of the front ultrasonic sensor 7 can be assumed to be plausible. Correspondingly, the echoes or the measured values 27 in the block 29 can be assumed to be plausible and therefore confirmed because the sequence 31 of the rear ultrasonic sensor 12 also contains assigned measured values 32. If appropriate, the actual measured values or amplitudes, that is to say the distances, can also be compared with one another here.

A further example is illustrated in FIG. 2B. Here, an exemplary sequence 26 of measured values 27 of the front ultrasonic sensor 7 is also illustrated in comparison with an exemplary sequence 31 of measured values 32 of the rear ultrasonic sensor 12. The control device 19 detects that measured values are missing from the sequence in blocks 33, 34 and 35. The control device 19 then checks whether or not measured values are present in the sequence 31 of the rear ultrasonic sensor 12 at assigned locations. In the exemplary embodiment according to FIG. 2B, these measured values 32 are present in the blocks 33, 34 and 35. In this case, the control device 19 adds measured values 32 of the rear ultrasonic sensor 12 to the sequence 26 of the front ultrasonic sensor 7, as is indicated by means of arrows 36 in FIG. 2B.

Similarly to the exemplary embodiment according to FIG. 2A, in the exemplary embodiment according to FIG. 2C no measured values from the sequence 26 of the front ultrasonic sensor 7 are present in two blocks 37, 38 either. Checking by the control device 19 reveals that no corresponding measured values are present at assigned locations in the sequence 31 of the rear ultrasonic sensor 12 either, with the result that the sequence 26 of the measured values 27 is assumed to be plausible.

The time sequence 26 of measured values 27 of the front ultrasonic sensor 7 is therefore compared with the time sequence 31 of measured values 32 of the rear ultrasonic sensor 12, and the plausibility thereof is therefore checked. The boundaries of the parking space 20, in particular also the lateral boundary, for example in the form of the kerb 23, can therefore be sensed particularly precisely and reliably. Measured values which are possibly missing from the sequence 26 of the front ultrasonic sensor 7 can in fact be replaced by assigned measured values 32 from the sequence 31 of the rear ultrasonic sensor 12.

The invention claimed is:

1. A method for detecting a parking space by a parking assistance system of a motor vehicle while the motor vehicle is travelling past the parking space, having the steps:
   acquiring a time sequence of measured values by means of a first sensor of the parking assistance system while the vehicle is travelling past,
   acquiring a time sequence of measured values by means of a second sensor, arranged at a distance from the first sensor, of the parking assistance system while the vehicle is travelling past, and
   detecting the parking space on the basis of the measured values of at least one of the sensors,
   wherein for the detection of the parking space the measured values of the first sensor and the measured values of the second sensor are acquired redundantly, and the plausibility of the time sequence of the measured values of the first sensor is checked on the basis of the measured values of the second sensor.

2. The method according to claim 1, wherein a front sensor which is arranged in a front region of the motor vehicle on a side, is used as a first sensor.

3. The method according to claim 1, wherein a rear sensor, which is arranged in a rear region of the motor vehicle on a side, is used as a second sensor.

4. The method according to claim 1, wherein for the plausibility checking the measured values of the sequence of the first sensor are assigned in pairs to corresponding measured values of the sequence of the second sensor, with the result that the measured values which are assigned to one another relate to one and the same spatial point.

5. The method according to claim 4, wherein the measured values are assigned as a function of a distance between the sensors in the longitudinal direction of the vehicle and/or as a function of a distance covered while the vehicle is travelling past.

6. The method according to claim 1, wherein measured values from the time sequence of the second sensor are added to the time sequence of the measured values of the first sensor.

7. The method according to claim 1, wherein when a measured value is missing from the sequence of the first sensor, a check is performed to determine whether a corresponding measured value has been acquired in the sequence of the second sensor, and:
- when the corresponding measured value is missing from the sequence of the second sensor, the sequence of the first sensor is assumed to be plausible, and
- when the corresponding measured value is present in the sequence of the second sensor, this measured value is added to the sequence of the first sensor.

8. The method according to claim 1, wherein the detection of the parking space includes a length and/or a width of the parking space being determined on the basis of the measured values.

9. The method according to claim 1, wherein ultrasonic sensors are used as sensors.

10. A parking assistance system for a motor vehicle, for detecting a parking space while the motor vehicle is travelling past the parking space, having:
- a first sensor for acquiring a time sequence of measured values,
- a second sensor, arranged at a distance from the first sensor, for acquiring a time sequence of measured values and
- detection means for detecting the parking space on the basis of the measured values of at least one of the sensors,
- wherein for the detection of the parking space the measured values of the first sensor and the measured values of the second sensor are acquired redundantly, and the parking assistance system has testing means which check the plausibility of the time sequence of the measured values of the first sensor on the basis of the measured values of the second sensor.

11. A motor vehicle having a parking assistance system according to claim 10.

\* \* \* \* \*